United States Patent
Curran et al.

(10) Patent No.: US 8,516,922 B2
(45) Date of Patent: Aug. 27, 2013

(54) BICYCLE PEDAL ASSEMBLY

(75) Inventors: Sean Curran, Caldwell, NJ (US); Frank Lam, Green Brook, NJ (US)

(73) Assignee: Animal Bikes, Inc., Jersey City, NJ (US)

( * ) Notice: Subject to any disclaimer, the term of this patent is extended or adjusted under 35 U.S.C. 154(b) by 0 days.

(21) Appl. No.: 13/273,464

(22) Filed: Oct. 14, 2011

(65) Prior Publication Data

US 2012/0090424 A1 Apr. 19, 2012

Related U.S. Application Data

(60) Provisional application No. 61/455,105, filed on Oct. 14, 2010.

(51) Int. Cl.
*B62M 3/00* (2006.01)

(52) U.S. Cl.
USPC .......................................... 74/594.4; 74/594.1

(58) Field of Classification Search
USPC ................. 74/594.1, 594.4; 384/276
See application file for complete search history.

(56) References Cited

U.S. PATENT DOCUMENTS

| | | | |
|---|---|---|---|
| 1,535,601 A | 4/1925 | Graham | |
| 2,567,785 A | 9/1951 | Reiger | |
| 3,382,734 A | 5/1968 | Hussey | |
| 3,485,113 A * | 12/1969 | Adcock | 74/594.4 |
| 3,592,076 A | 7/1971 | Baginski et al. | |
| 3,807,255 A * | 4/1974 | Baginski | 74/594.4 |
| 4,103,563 A | 8/1978 | Genzling | |
| 4,373,760 A | 2/1983 | Durham | |
| 527,384 A | 10/1984 | Davids | |
| 4,651,590 A * | 3/1987 | Thun | 74/594.1 |
| 4,882,946 A | 11/1989 | Beyl | |
| 4,893,523 A | 1/1990 | Lennon | |
| 4,898,048 A | 2/1990 | Sampson | |
| 4,936,164 A | 6/1990 | Forke | |
| 4,969,373 A | 11/1990 | Good | |
| 5,549,396 A | 8/1996 | Chiang | |
| 5,727,429 A | 3/1998 | Ueda | |
| 5,755,144 A | 5/1998 | Ueda | |
| 5,992,266 A | 11/1999 | Heim | |
| 6,205,885 B1 | 3/2001 | Hermansen et al. | |
| 6,282,984 B1 | 9/2001 | Chen | |
| 6,393,940 B1 | 5/2002 | Ueda | |
| 6,543,309 B2 * | 4/2003 | Heim | 74/594.6 |
| 6,647,826 B2 | 11/2003 | Okajima et al. | |
| 6,925,908 B2 | 8/2005 | Muraoka | |
| 7,174,807 B2 | 2/2007 | Bryne | |
| 7,475,616 B2 * | 1/2009 | Malle | 74/594.6 |
| 8,017,668 B2 * | 9/2011 | Tanaka et al. | 523/149 |
| 2005/0252337 A1 | 11/2005 | Chen | |
| 2006/0241725 A1 | 10/2006 | Libbus et al. | |
| 2010/0064845 A1 | 3/2010 | French | |

FOREIGN PATENT DOCUMENTS

| | | | | |
|---|---|---|---|---|
| JP | 09079262 A | * | 3/1997 | |
| JP | 2001343022 A | * | 12/2001 | |
| JP | 2003056566 A | * | 2/2003 | |

* cited by examiner

*Primary Examiner* — Thomas R Hannon
*Assistant Examiner* — Kashif Mohammed
(74) *Attorney, Agent, or Firm* — Lawrence G. Fridman

(57) ABSTRACT

A bicycle pedal assembly having a pedal body rotatably coupled to a pedal shaft. A bore receiving the pedal shaft passes through the pedal body. A semi-cylindrical shoulder extends outwardly from an exterior surface of the shaft. A bushing is positioned within the bore to rotatably support the pedal shaft. An inner surface of the shoulder rotatably engages the external end of the bushing, so that the second end of the shaft is movably connected to the pedal body without assistance of any fasteners.

11 Claims, 6 Drawing Sheets

BICYCLE PEDAL ASSEMBLY

This application claims priority of U.S. Provisional Application Ser. No. 61/455,105 filed Oct. 14, 2010, which application is being incorporated by reference in its entirety.

FIELD OF INVENTION

The invention relates to bicycles in general, more specifically it relates to bicycle pedals and methods of their assembly.

DISCUSSION OF THE PRIOR ART

It is well known that the bicycle pedal assemblies of the prior art often require various fasteners for keeping the assemblies together. For example, in the prior art independent fasteners are typically required for securing the pedal body on the pedal shaft or spindle. It is not uncommon for such independent fasteners to become loose, causing failure and malfunction of the entire pedal assembly.

Furthermore, the prior art methods of assembly of the pedal units are often quite complex, laborious and require special tools. This is because, the body of the pedal is typically positioned or inserted on the spindle from the outer end of the pedal shaft or spindle which is opposite to the end facing the crank arm. This operation often requires preparatory steps, including provision of sub-assemblies which are needed to secure the entire bicycle pedal assembly together.

Accordingly, one of the objects of the present invention is to provide a new and improved bicycle pedal assembly which does not require independent fasteners associated with the exterior end of the spindle. This makes the pedal assembly of the invention more reliable, minimizing possibility of failure and/or malfunction.

A further object of the present invention is to provide a simplified method of the bicycle pedal assembly according to which the body of the pedal is inserted on the spindle from the end of the spindle facing the crank arm.

SUMMARY OF THE INVENTION

One aspect of the invention provides a bicycle pedal assembly including a pedal body rotatably coupled to a pedal shaft, a bore receiving the pedal shaft passing through the pedal body. The pedal shaft is formed having a first end coupled to a bicycle crank arm and a second end and with a restricting shoulder extending outwardly from an exterior surface of the second end of the shaft. A bearing/sleeve is positioned within the bore, so as to rotatably support the pedal shaft. The sleeve is formed with an outer end facing the second end of the shaft and an inner end facing the crank arm.

An inner surface of the restricting shoulder rotatably engages the external end of the sleeve bearing, so that the second end of the shaft is rotatably connected to the pedal body without assistance of any fasteners.

According to another aspect of the invention a frustroconical member is provided having an inner face and outer face positioned on the shaft at the first end. The inner face of the frustro-conical member has an outer periphery being substantially smaller than the outer periphery of the outer face. The outer face rotatably engages the inner end of the sleeve and the inner face faces the crank arm.

As to a further aspect of the invention, the pedal body is restricted from movement in the longitudinal direction between the inner surface of the shoulder and the outer surface of the restricting member. This prevents longitudinal motion of the pedal body along the pedal shaft without assistance of any fasteners, while promoting the rotational motion of the pedal on the shaft.

As to still another aspect of the invention, an interface between an external face of the shoulder and the inner hollow surface of the shaft is substantially smooth.

DETAILED DESCRIPTION OF THE INVENTION

Figure 1:
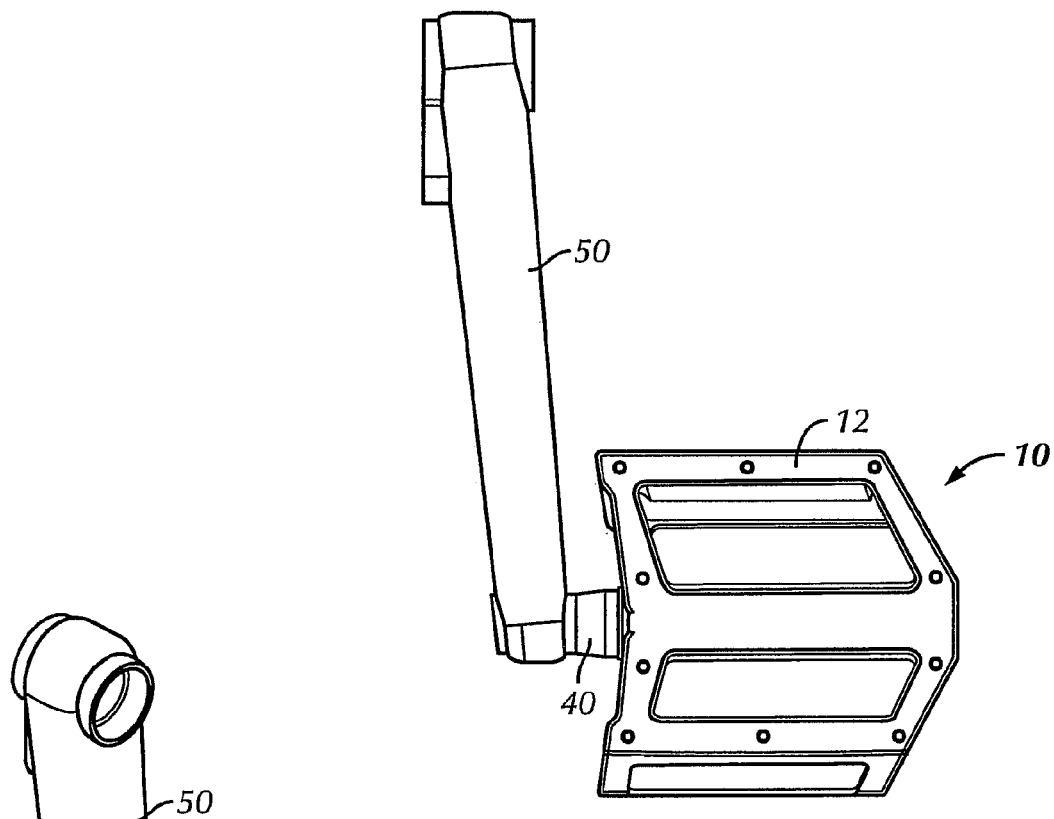
FIG. 1 is an elevational view showing a bicycle pedal assembly according to one embodiment of the invention being connected to a crank arm.
Figure 2:
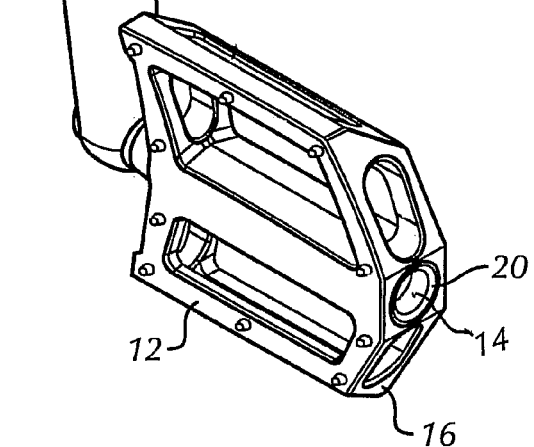
FIG. 2 is a semi-perspective view of the assembly.

Referring now to the drawings in general, and to FIGS. 1-5 specifically, illustrating a first embodiment of the bicycle pedal assembly 10. The invention provides a bicycle pedal assembly 10 comprising a pedal body 12 for supporting a foot of a cyclist which is rotatably coupled to the pedal shaft or spindle 20 for rotation about a longitudinal axis of the shaft. Typically, the pedal shaft or spindle 20 is substantially hollow. However, a solid or semi-solid pedal shaft is also contemplated. The pedal body 12 is formed with an inboard end 17 and an outboard end 16. The pedal body has a bore or aperture 14, extending from the inboard end to the outboard end, for rotatably receiving the pedal shaft or spindle 20. The pedal shaft 20 has a first end 22 threadably or fixedly coupled to a bicycle crank arm 50 for rotation therewith and a second end 24.

Referring now to FIGS. 1-5 and 9, where one embodiment of the pedal shaft or spindle 20 will be discussed in more detail. The first end 22 of pedal shaft is adapted to be fixedly coupled to crank arm 50. In one embodiment of the invention, the first end 22 is provided with external threads configured to engage internal threads formed in the receiving aperture 52 of the respective crank arm 50. However, any conventional connection between the first end of the pedal shaft and crank arm 50 is also contemplated. The second end 24 of the pedal shaft is designed for rotatable coupling to the pedal body. An inner sleeve or bearing 30 having at least a pair of bearing members 38 and 34 is associated with the pedal shaft to rotatably mount the pedal body 12 on the shaft. The right bicycle pedal assembly is identical to the left bicycle pedal assembly 10, except that the shaft of the right bicycle pedal assembly has opposite threads.

The outer end 24 of the shaft is formed with the restricting shoulder 26 which extends outwardly from the exterior surface of the spindle 20. The purpose of the shoulder 26 is to restrict longitudinal motion of the pedal body 12 on the spindle 20, when the spindle is connected to the crank arm 50. In this manner, the restricting shoulder 26 movably and rotatably engages the bearing member 38 and restricts longitudinal motion of the pedal body 12 on the shaft.

Figure 3:
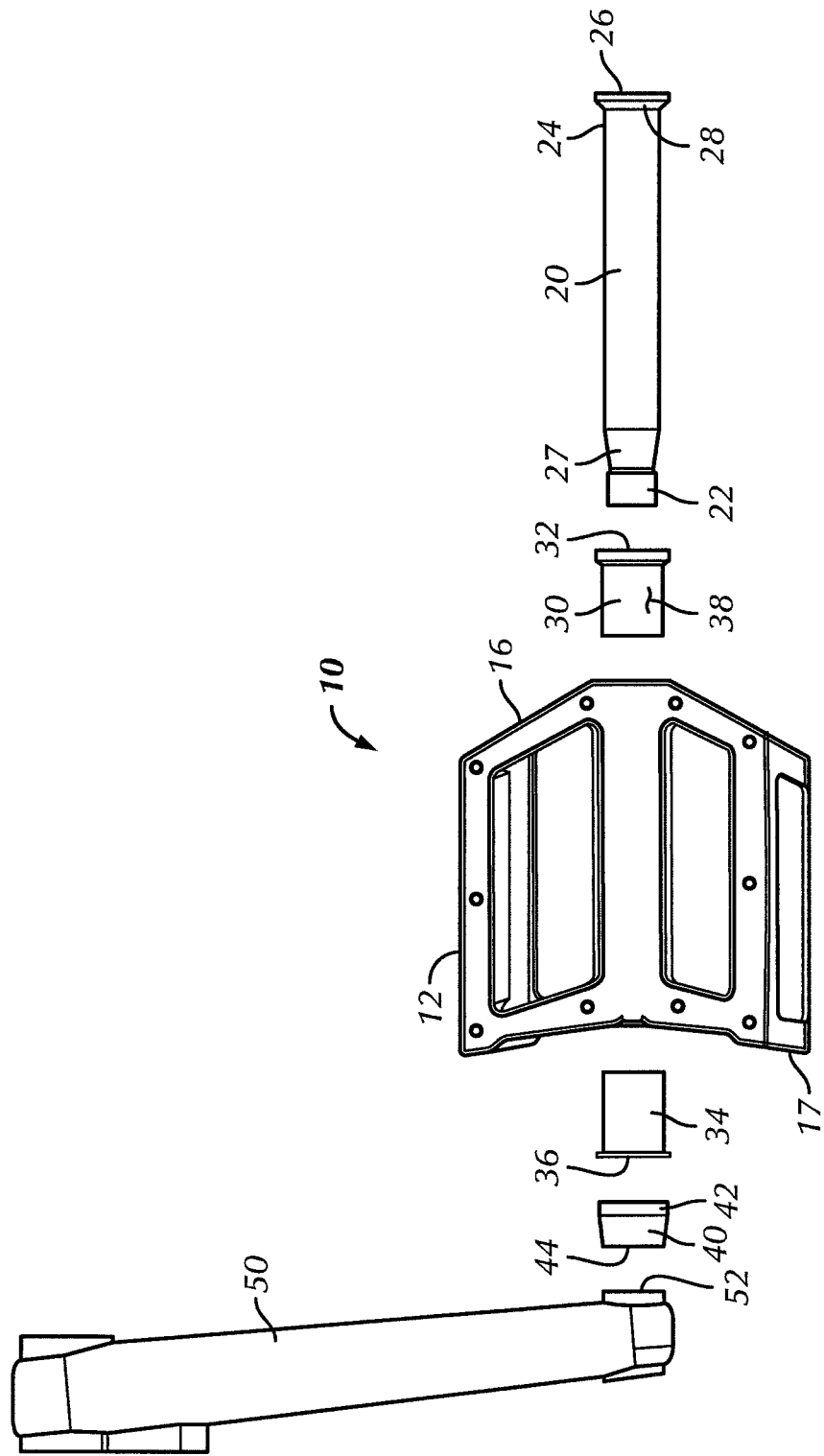
FIG. 3 is an exploded view of the bicycle pedal assembly according to one embodiment of the invention.
Figure 4:
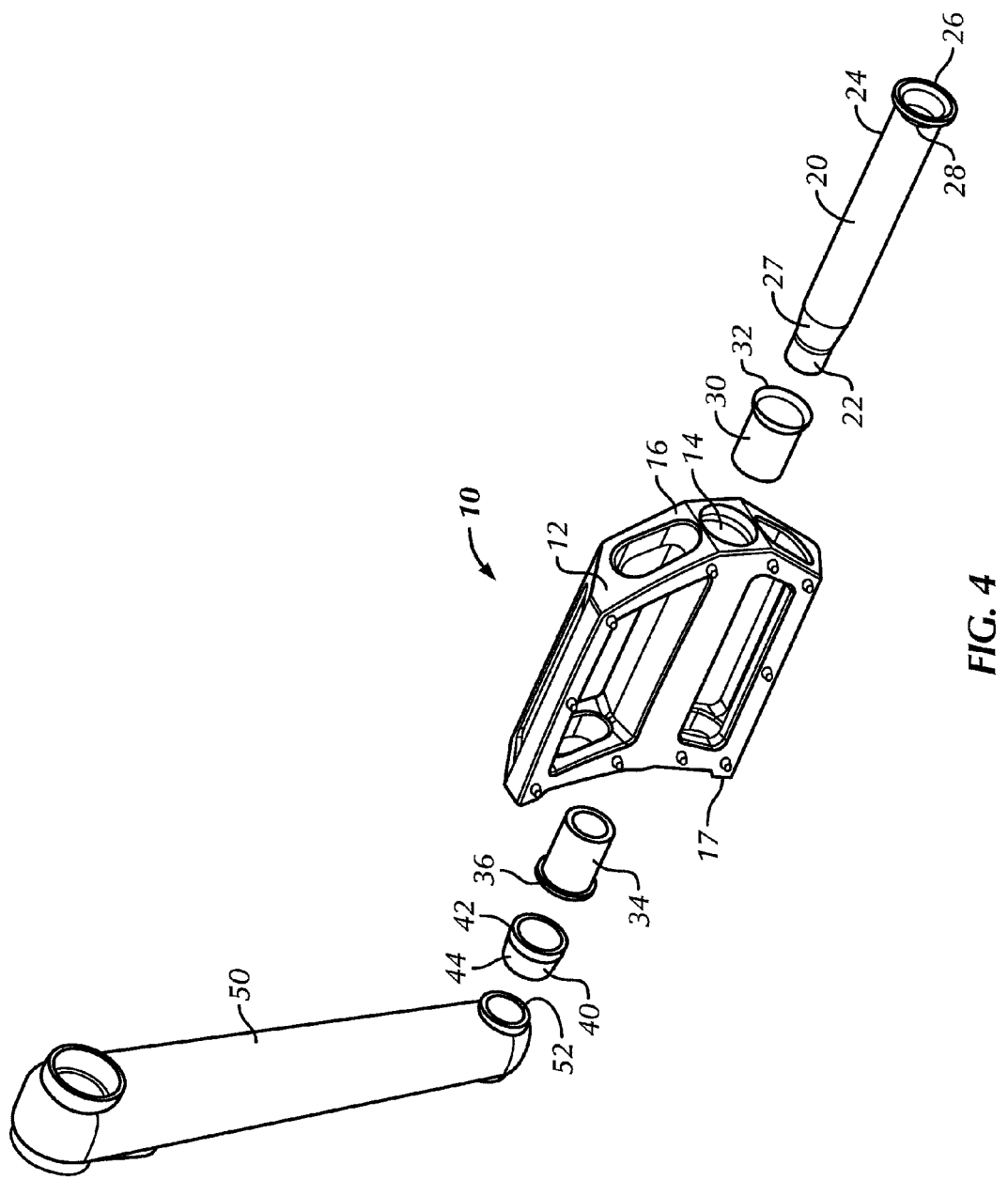
FIG. 4 is another exploded view of the assembly.
Figure 5:
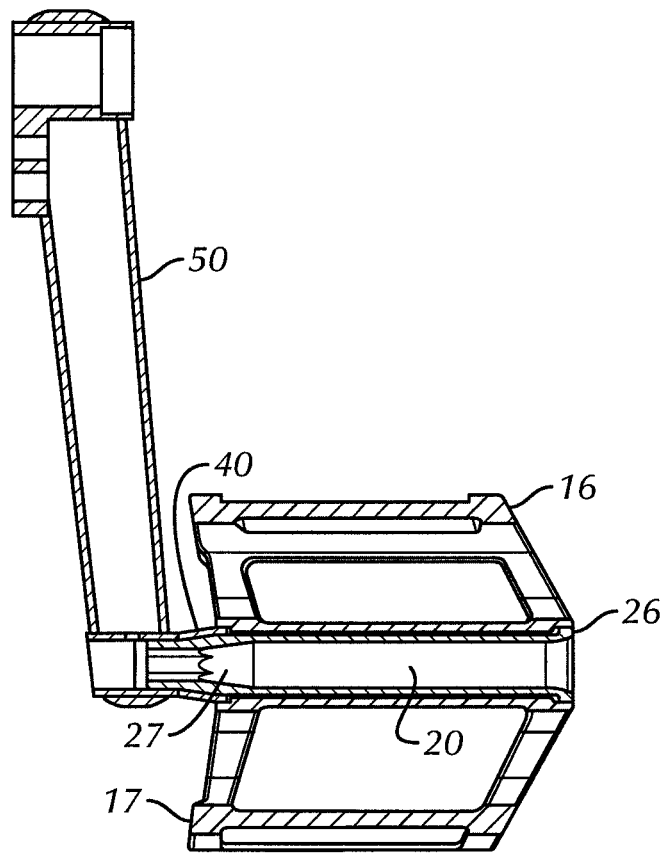
FIG. 5 is a section view showing the bicycle pedal assembly being connected to a crank arm.

FIGS. 3-5 illustrate the embodiment of the invention in which a diameter of the first end 22 of the pedal shaft is smaller than the diameter of the remaining part thereof including the second end 24. In the vicinity of the first end 22, a conical transition region 27 is formed, so as to provide a transition between the larger and smaller diameters of the shaft 20. To accommodate the transition region 27, a frustro-conical stop member 40 is provided having inner 44 and outer 42 faces and positioned on the transition region at the first end of the shaft. It is illustrated in these figures, that the inner face 44 of the frustro-conical stop member 40 has an outer periphery which is substantially smaller than the outer periphery of the outer face 42 thereof. In the assembled condition, the outer face 42 of the conical member rotatably engages the inner end 36 of the bushing 34 and the inner face 44 faces the receiving aperture 52 of the crank arm 50.

In the embodiment of FIGS. 3-5, the pedal body 12 is restricted from movement in the longitudinal direction between the inner face 28 of the shoulder 26 and the outer face 42 of the stop or restricting frustro-conical member 40. Thus, longitudinal motion of the pedal 12 along the pedal shaft 20 is restricted without assistance of any fasteners, while rotational motion of the pedal of the shaft is promoted.

A sleeve bearing 30 is positioned within the bore 14, so as to rotatably accommodate and support the pedal shaft 20. The sleeve bearing is formed having an external end 32 facing the second end 24 of the shaft, and having an inner end 36 facing the crank arm 50. In the embodiment of FIGS. 1-4, the sleeve bearing 30 is formed having at least two or more individual members, inserts 38 and 34 positioned within the bore 14. Alternatively, the sleeve bearing can be formed as a single piece uniformly extending through the length of the bore 14 of the pedal body. The second end 24 of the shaft is formed with a restricting shoulder 26 extending outwardly from an exterior cylindrical surface of the shaft. An intermediate portion is provided at an interface between the outer substantially cylindrical portion of the shaft 20 and an inner face 28 of the shoulder. The intermediate portion provides a smooth area of transition between the exterior surface of the shaft 20 and the inner face 28 of the shoulder, so as to facilitate rotational engagement of the shaft 20 with the external end 32 of the sleeve 30. Thus, the second end 24 of the shaft is movably or rotatably connected to the outboard end 16 of the pedal body and the exterior sleeve member 38 without assistance of any fasteners. The intermediate portion can be formed having radial, conical or any other conventional configuration facilitating rotational engagement between the inner face 28 of the restricting shoulder and the exterior portion of the sleeve bearing.

In the embodiment, where the pedal shaft 20 has a substantially hollow body (see FIG. 9), a longitudinal inner opening 29 having inner surface 31 is formed at least at the second end 24. A smooth area of transition is formed between an exterior surface of the shaft and the inner face 28 of the restricting shoulder, and between the internal surface 31 of the longitudinal inner opening 29 and the outer face 33 of the shoulder. Thus, the external end 32 of the sleeve bearing rotatably engages the smooth area of transition between the shoulder 26 and the outer surface of the shaft.

The bearing sleeve 38 is part of the pedal body 12 and rotates therewith about the shaft 20. When a force is applied in a direction of the rotational axis of the pedal body 12 towards the inboard end 17, the interface between the shoulder 26 and the external end 32 of the sleeve 38 absorbs the shock therefrom and prohibits the pedal body 12 from moving along the rotational axis of the pedal shaft 20. The bearing sleeves 38,34 are formed from a plastic-like material which possesses inherently favorable bearing characteristics without requiring lubrication.. In this manner, the pedal body 12 may spin freely with respect to the pedal shaft 20 in a silent, efficient manner.

Figure 6:
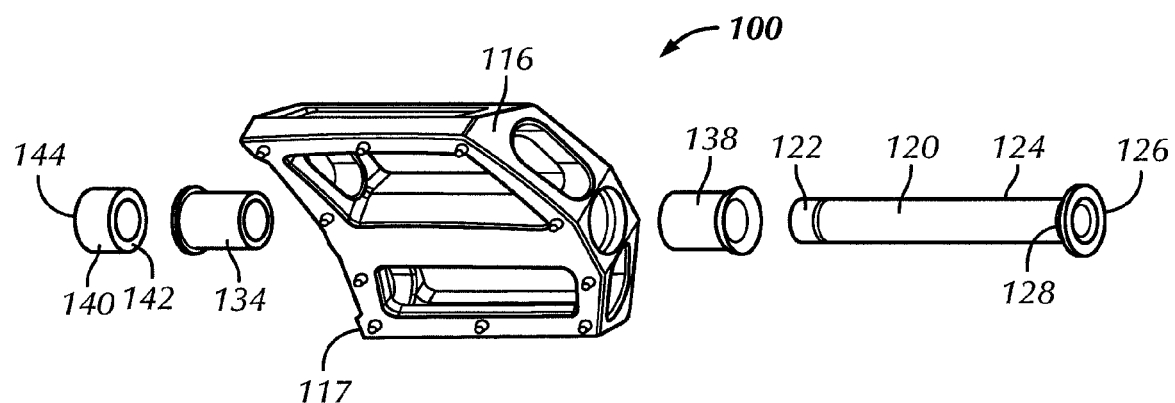
FIG. 6 is an exploded view showing a bicycle pedal assembly according to another embodiment of the invention.
Figure 7:
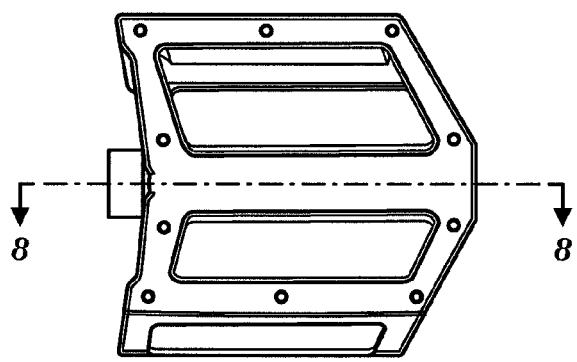
FIG. 7 is an elevational view of the pedal assembly shown in FIG. 6.
Figure 8:
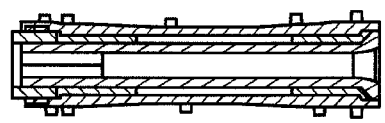
FIG. 8 is a sectional view according to Section line 8-8 of FIG. 7.
Figure 9:
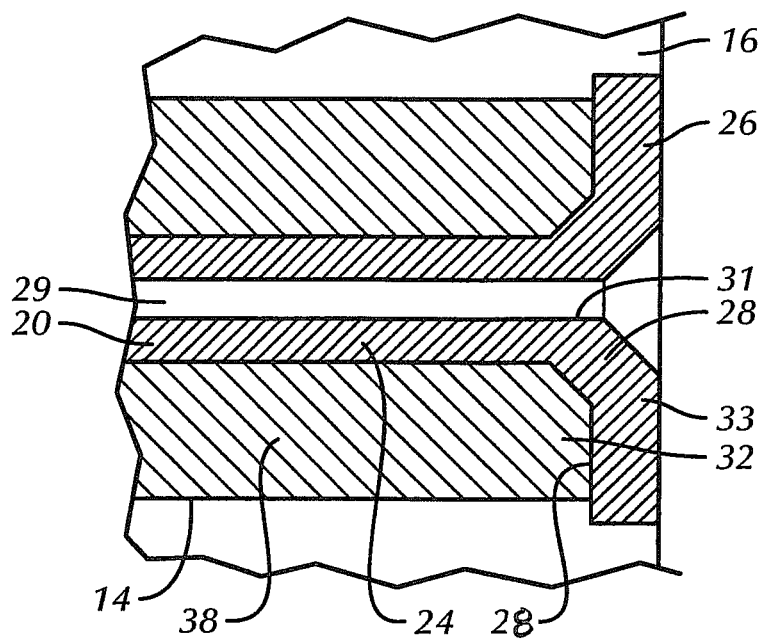
FIG. 9 is a partial section view illustrating an interface between an end of the shaft and an outward end of the pedal body.

In the embodiment of FIGS. 6-8, the pedal shaft 120 is formed having a constant diameter through its entire length. In this embodiment, a semi-cylindrical stop 140 member is provided having an inner face 144 and outer face 142, and adapted for positioning at the first end 122 of the shaft and engage a bicycle crank arm. In a manner similar to the discussed hereinabove, the outer face 142 of the stop member 140 rotatably engages the inner end of the bearing member 134, whereas the inner face 144 faces the respective crank arm.

Figure 10:
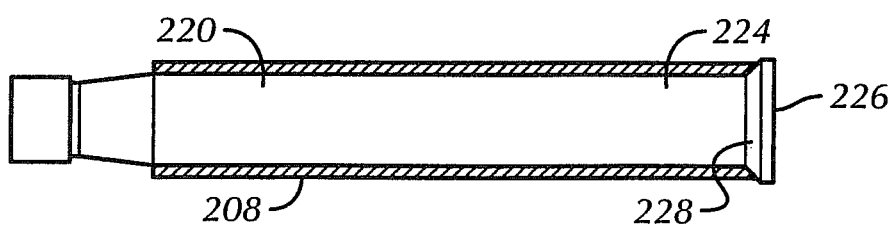
FIG. 10 is a partial section view of a further embodiment of the pedal shaft.

Referring now to FIG. 10 where another embodiment of the pedal shaft or spindle 220 is illustrated. In this embodiment a layer of plastic coating 208 is provided at an outer periphery of the shaft. The plastic coating 208 performs a bearing function and facilitates rotation of the pedal body on the shaft. The plastic coating 208 possess favorable bearing qualities and does not require lubrication. Thus, in the embodiment of FIG. 10, where the pedal shaft 220 with the plastic coating 208 is utilized, the previously discussed bearings or sleeves can be eliminated from the bicycle pedal assembly. Otherwise the pedal shaft 220 operates in a manner similar to that of the previously discussed embodiments. The pedal shaft with the restricting shoulder 226 including the transition portion 228 is rotatably coupled to the bore of the pedal body at the outward end.

Various techniques can be utilized for providing the plastic coating 208 on the shaft 220. For example, an injection molding process is usable for this application, where the pedal shaft is placed inside of a mold and plastic is injected into the mold at a high pressure. As to another application, an extruded plastic sleeve can be cut to a suitable length having an appropriate shape and size. The plastic sleeve is passed on the shaft, heat is subsequently applied to shrink the plastic and then ultrasound is used to calibrate the plastic sleeve on the shaft. By calibrating the shaft against the sleeve the proportions are adjusted, so they are within the tolerances when the shaft is passed on the sleeve at the time as ultrasound is applied. This procedure is applicable to obtain better adaptation of the plastic coating and the sleeve. A further technique which is applicable in providing plastic coating is to use a plastic powder which is applied to a heated metal. The temperature in the process must be higher than the melting point of plastic. In this way the powder will form a required layer of plastic on the metal.

According to the method of the invention, the pedal body 12 is positioned on the shaft 20 from the inner end 22 facing the crank arm 50. During the assembly, the pedal body is slid on the shaft in the direction from the inner 22 to the outer 24 end thereof. In the assembled condition, a further longitudinal motion of the pedal body 12 is prevented by the restricting shoulder 26. On the contrary, in the prior art, the pedal body is typically positioned on the spindle from the outer end thereof and slid on the spindle from the outer end in the direction of the inner end thereof. In the prior art, during the assembly, independent fasteners are often needed and provided to secure the pedal body on the shaft or spindle. The pedal body assembly, including the shaft 20 which is rotatably coupled within the pedal body 12 by means of the bearing members 34 and 38, is then threadably connected to the crank arm 50. By using the above-discussed methods bicycle pedal shafts of higher accuracy and precision can be produced with specified tolerances and limits.

The bearing sleeves 34 and 38 are formed with respective apertures therein defining a portion of the main aperture for receiving the pedal shaft 20 in a rotational manner. When the sleeve bearing 38 and shaft 20 are properly connected, the sleeve bearing 34 is positioned in the bore 14 and fitted therein. This assures alignment of the sleeve bearings 38, 34, such that the rotational axis of the pedal body 12 and the pedal shaft 20 will be coextensive with each other and thus maximize the spin characteristics of the pedal assembly.

In the preferred embodiment of the invention, various elements of the assembly, such as the spindle 20 having the shoulder 26, the pedal body 12 and the stop member 40 exist independently. During the assembly procedure, these elements can be independently attached to each other and then connected to the crank arm. Such independent elements are easily replaceable and can be simply substituted.

In the invention, the pedal shaft 20, 120 is integrated in a single unit which can be manufactured from a single piece of metal or plastic. Since there are no independent fasteners provided at the outer end of the assembly, the invention is more reliable than the prior art. It is well known that when independent fasteners become loose, they cause failure or malfunction of the entire pedal assembly.

The bicycle pedal assembly 10 or 100 of the invention is especially designed for use with BMX or Mountain bicycles. However, it will be apparent to those skilled in the art from this disclosure that the features of the bicycle pedal assembly can be used in the construction of any type of bicycle pedal assemblies if needed and/or desired. For example, the pedal assembly can be used for road bicycles.

What is claimed is:

1. A bicycle pedal assembly comprising:
    a pedal body rotatably coupled to a pedal shaft, a bore receiving the pedal shaft passing through the pedal body;
    the pedal shaft having a first end coupled to a bicycle crank arm and a second end, a restricting shoulder having an inner surface extends outwardly from the second end of the shaft, a conical transition region formed on the pedal shaft at the first end thereof;
    a sleeve bearing positioned within the bore, so as to rotatably support the pedal shaft thereinside, the sleeve is formed with an outer member facing the second end of the shaft and an inner member facing the crank arm;
    a frustro-conical stop adapted for engagement with the conical transition region of the pedal shaft, said stop having an inner face and an outer face positioned on the shaft at the first end thereof; and
    said inner face of the frustro-conical stop has an outer periphery being substantially smaller than an outer periphery of the outer face of the frustro-conical stop, the outer face rotatably engages the inner member of the sleeve and the inner face faces the crank arm;
    wherein the inner surface of the restricting shoulder rotatably engages the outer member of the sleeve bearing, so that the second end of the shaft is movably connected to the pedal body without assistance of any fasteners.

2. The bicycle pedal assembly according to claim 1, wherein the pedal body is restricted from movement in a longitudinal direction between the inner surface of the shoulder and the outer face of the stop, so as to prevent longitudinal motion of the pedal body along the pedal shaft without assistance of any fasteners, this occurs during the rotational motion of the shaft and the rotational motion of the pedal on the shaft.

3. The bicycle pedal assembly according to claim 1, wherein the pedal shaft is substantially hollow.

4. The bicycle pedal assembly according to claim 3, wherein an interface between an external face of the shoulder and the inner hollow surface of the shaft is radially shaped.

5. The bicycle pedal assembly according to claim 4, wherein said interface is in a form of a radial portion provided between an external surface of the shoulder and the inner surface of the shaft.

6. The bicycle pedal assembly according to claim 4, wherein a radially shaped area is provided at the interface between the external surface of the shaft and the inner surface of the shoulder adapted for rotatable engagement with the outer member of the sleeve bearing.

7. The bicycle pedal assembly according to claim 1, wherein said pedal shaft is formed with a longitudinal inner opening formed at least at the second end thereof, said inner opening having a longitudinally extending internal surface, an area of transition is provided between an exterior surface of the shaft and the inner surface of the restricting shoulder, and between the internal surface of the longitudinal inner opening and the outer surface of the restricting shoulder.

8. A method of bicycle pedal assembly, wherein the bicycle pedal comprises a pedal body extending between an inboard end and an outboard end and formed with a bore passing therethrough, a pedal shaft having a first end coupled to the bicycle crank arm and a second end, a restricting shoulder having an inner surface that extends outwardly from the second end of the shaft, a conical transition region is formed at the first end of the pedal shaft, a frustro-conical stop having an inner face and an outer face, the inner face of the frustro-conical stop having an outer periphery being substantially smaller than an outer periphery of the outer face of the frustro-conical stop, a sleeve bearing provided with an inner member and an outer member is positioned within the bore, so as to rotatably support the shaft within said bore, said method comprising the steps of:
    insertion of the pedal body on the pedal shaft from the first end thereof, so that said body is slid on the shaft in the direction from the first end to the second end of the shaft;
    positioning the pedal body on the shaft, so that said restricting shoulder engages the outer member of the sleeve to prevent longitudinal motion of the pedal body on the pedal shaft;
    positioning the frustro-conical stop on the shaft at the first end thereof; engaging the frustro-conical stop with the conical transition region of the pedal shaft, and
    rotatably engaging the outer face of the stop with the inner member of the sleeve and engaging the inner face of the stop with the crank arm;
    wherein the pedal body being restricted from movement in the longitudinal direction between the inner surface of the shoulder and the outer face of the frustro-conical stop, preventing longitudinal motion of the pedal body along the pedal shaft without assistance of any fasteners, occurring during the rotational motion of the shaft and the rotational motion of the pedal on the shaft.

9. The method of claim 8, wherein said pedal shaft has a longitudinal inner opening formed at least at the second end thereof, said inner opening having a longitudinally extending internal surface.

10. The method according to claim 9, wherein a transition portion is provided at an interface between substantially cylindrical body of the shaft and the restricting shoulder, so as to provide a radial area of transition between an exterior surface of the shaft and the inner face of the restricting shoulder and between the internal surface of the longitudinal inner opening and the outer surface of the shoulder, wherein in said step of positioning the pedal body on the shaft, the second end of the shaft including the restricting shoulder is rotatably connected to the outboard end of the pedal body and to the outer member of the sleeve bearing without assistance of any fasteners.

11. The method according to claim 8, further comprising the step of rotational engagement, wherein the outer member of the sleeve bearing rotatably engages a radial transition portion between the restricting shoulder and the outer surface of the shaft.

* * * * *